United States Patent [19]

Banevicius et al.

[11] Patent Number: 5,204,410
[45] Date of Patent: * Apr. 20, 1993

[54] METHOD FOR REMOVING VOLATILE SUBSTANCES FROM POLYPHENYLENE ETHER OR POLYPHENYLENE ETHER/STYRENE RESIN COMPOSITIONS

[75] Inventors: John P. Banevicius, Slingerlands; Alexandros Hasson, Delmar; William E. Pecak, Cohoes, all of N.Y.

[73] Assignee: General Electric Company, Pittsfield, Mass.

[*] Notice: The portion of the term of this patent subsequent to Apr. 7, 2009 has been disclaimed.

[21] Appl. No.: 606,415

[22] Filed: Oct. 31, 1990

Related U.S. Application Data

[62] Division of Ser. No. 291,534, Dec. 29, 1988, Pat. No. 4,992,222.

[51] Int. Cl.⁵ .............................. C08L 71/12
[52] U.S. Cl. .................. 525/132; 264/45.9; 264/101; 525/905
[58] Field of Search ............ 264/45.9, 46.1, 101, 264/102, 349; 159/2.2; 425/203; 525/905

[56] References Cited

U.S. PATENT DOCUMENTS

| | | | |
|---|---|---|---|
| 3,633,880 | 1/1972 | Newmark | 425/203 |
| 3,917,507 | 11/1975 | Skidmore | 159/2.2 |
| 4,065,532 | 12/1977 | Wild et al. | 425/203 |
| 4,369,278 | 1/1983 | Kasahara et al. | 264/102 |
| 4,504,338 | 3/1985 | Ives | 264/46.1 |
| 4,746,482 | 5/1988 | Ribbing et al. | 264/102 |
| 4,806,297 | 2/1989 | Brown et al. | 264/102 |
| 4,902,455 | 2/1990 | Wobbe | 264/102 |
| 5,102,591 | 4/1992 | Hasson et al. | 264/101 |

FOREIGN PATENT DOCUMENTS 58-211434 12/1983 Japan ...................... 425/203

*Primary Examiner*—Jeffery Thurlow
*Attorney, Agent, or Firm*—Andrew C. Hess

[57] ABSTRACT

Volatile substances in polyphenylene ether or polyphenylene ether/polystyrene compositions are substantially reduced by extruding the resins in a single pass using a plurality of stages comprising water injection and vacuum venting.

7 Claims, 1 Drawing Sheet

METHOD FOR REMOVING VOLATILE SUBSTANCES FROM POLYPHENYLENE ETHER OR POLYPHENYLENE ETHER/STYRENE RESIN COMPOSITIONS

This is a divisonal of application Ser. No. 291,534, filed Dec. 29, 1988 U.S. Pat. No. 4,992,222 issued Feb. 12, 1991.

This invention relates to the substantial removal of volatile substances from polyphenylene ether or polyphenylene ether/polystyrene compositions and, more particularly, to the reduction of volatile substances in an extruder comprising multiple stages of water injection followed by vacuum venting.

BACKGROUND OF THE INVENTION

Polyphenylene ethers are a class of polymers which are widely used in industry, especially as engineering plastics in applications which require such properties as toughness and heat resistance. For many such applications polyphenylene ether resins are blended with various types of polystyrene resins to improve their processability. Recently it has become necessary to produce such compositions which are both substantially odorless and tasteless for food contact applications. It is therefore necessary that the polyphenylene ether or polyphenylene ether/polystyrene composition be substantially free from any volatile materials which have undesirable odors or would otherwise harm the food. Materials of this kind which are known to be present in polyphenylene ether or polyphenylene ether/polystyrene resins include toluene, dialkylamines such as di-n-butylamine, which are components of the catalyst used in preparing polyphenylene ether resins; styrene monomers, from degradation of any styrene resin and other by-products resulting from polyphenylene ether resin synthesis. In the case of poly(2,6-dimethyl-1,4-phenylene ether); 2,4, 6-trimethylanisole, 7-methyldihydrobenzofuran, 2,3-dihydrobenzofuran, 2,6-dimethylcyclohexanone and 2-ethylhex 2-enal are commonly present. Removal of sources of volatile odoriferous amines and oxygenated species is especially important because they are detectable in human organoleptic tests even in very low quantities.

Methods are known, to those skilled in the art, for removing volatile substances from polyphenylene ether or polyphenylene ether/polystyrene resins during vented extrusion, with or without the injection of water into the melt. For example, Kasahara et al., U.S. Pat. No. 4,369,278 extrudes polyphenylene ether and rubber reinforced polystyrene in a single pass, single stage vacuum vented extruder with optional water injection; Newmark, U.S. Pat. No. 3,633,880, extrudes plastic materials, which could include polyphenylene ether, in a single pass through an extruder with multiple vents and employs a specially designed screw to compress and decompress the melt aiding devolatilization without employing water. U.S. Pat. No. 4,831,115 describes the extrusion of polyphenylene ether in a single pass single stage system using up to 15 percent water and vacuum venting. Although all three of the above-mentioned methods reduce the amount of volatile substances in the resin, none of them reduce the amount of volatile odoriferous species down to a level where such materials are hardly detectable by analytical methods thus providing that articles made from them are substantially odorless, especially in food packaging applications.

U.S. Pat. No. 4,906,700, issued to J. Banevicius, discloses a method for producing polyphenylene ether resin with a reduced content of phenolic by-products of the polymer synthesis, such as 2,4,6-trimethylanisole (2,4,6-TMA) and 7-methyldihydrobenzofuran (7-MDBF) in the initial production stage, but not the reduction of sources of residual amine components during post-production extrusion stages.

U.S. Pat. No. 4,994,217, issued to Banevicius et al, discloses method of producing low odor polyphenylene ether/polystyrene resins by solution blending and employing a sequence of devolatilizers to reduce the content odoriferous impurities present in the resin.

It has now been discovered that if the prior art processes are modified by using a single pass through an extruder and dividing the water injection/vacuum venting stage into at least two stages, each consisting of at least one water injection step and at least one vacuum venting step, remarkable and highly unexpected reductions in volatile content and in sources of odoriferous amine content are achieved. By way of illustration, in comparison with a single pass, single stage extrusion, a polyphenylene ether composition containing 8.5 ppm of 2,4,6-trimethylanisole (TMA) is reduced to 2.6 ppm, but in a single pass, two stages, the TMA content is reduced to levels barely detectable by gas chromatography (0.27 ppm). If a 50:50 blend of polyphenylene ether and polystyrene is sent through an extruder in a single pass, single stage with 3 percent water injection and vacuum venting, the styrene content is reduced to 1130 ppm and the toluene content is reduced to 271 parts per million; a back-to-back repitition using a single pass but two water injection/vacuum venting stages, using 1.5% by weight of water in each such stage, reduced the styrene content to 694 ppm and toluene content to 84 parts per million.

Furthermore, it has been surprisingly discovered that the use of a polyphenylene ether resin essentially free of phenolic by-products in the improved process of the present invention produces a resin with a very low content of any odoriferous components. This novel low odor resin can then be shaped into pellets for further processing or directly into solid sheets, molded or extruded articles, and foams which are highly desirable for use in food contact applications.

DESCRIPTION OF THE DRAWING

The drawing is illustrative of the apparatus which may be used to carry out the present invention. It illustrates a vertical cross section of a twin screw extruder having two stages of water injection each of which has its own vacuum venting stages.

SUMMARY OF THE INVENTION

Figure 1:
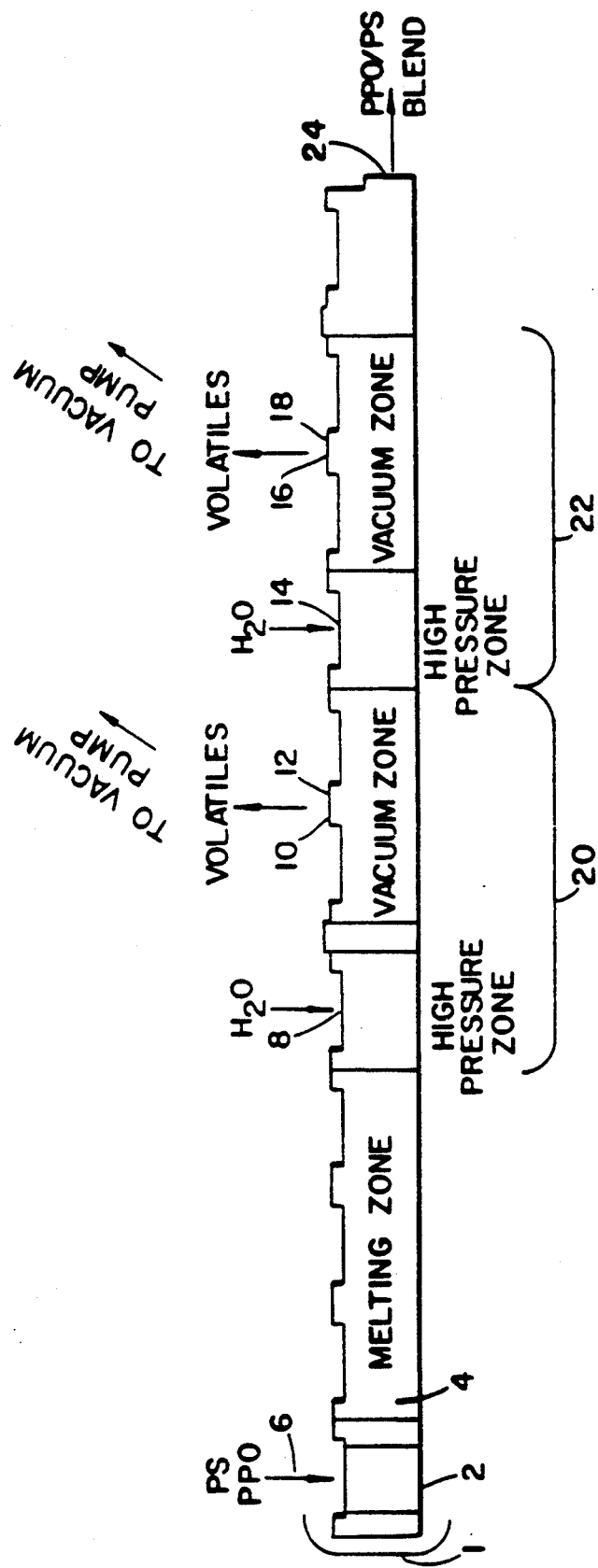

According to the present invention there is provided an improved process for the reduction of volatile substances in a composition comprising (a) a polyphenylene ether resin, alone, or in combination with (b) a styrene resin, said composition comprising impurities selected from styrene monomer, toluene, sources of volatile odoriferous amines, volatile odoriferous oxygenated species, mixtures of any of them and the like, said process comprising extruding said composition at a temperature above its melting point in one pass in at least two stages, each said stage comprising water injection followed by vacuum venting, the total amount of water being divided between said stages and comprising up to about 15 percent by weight of said composition whereby the devolatilization efficiency of both toluene and trimethylanisole is greater than about 70 percent in comparison with the reduction obtained with the same composition in one pass in a single stage employing the same amount of water.

The water can, for example, comprise liquid water or steam. Carbon dioxide can also be used instead of water. Preferably the polyphenylene ether resin comprises poly(2,6-dimethyl-1,4-phenylene ether), poly (2,6-dimethyl-co-2,3,6-trimethyl-1,4-phenylene ether) or a mixture thereof, but may also comprise a functionalized polyphenylene ether wherein the functionalizing agent comprises fumaric acid, maleic anhydride, citric acid, trimellitic anhydride acid chloride or a mixture of any of the foregoing. Preferably the styrene resin comprises a polystyrene homopolymer or a rubber modified polystyrene.

Nucleating agents selected from an organic or inorganic particulate material or a mixture thereof may be added in an effective amount, preferably talc up to about 2 percent by weight of the composition. This appears to favorably induce bubble formation and thereby increase surface area during devolatilization.

Preferably the total amount of water to be injected into the extrudate is from about 1 to about 10 percent by weight of said composition, divided equally or unequally between the stages, and the pressure of the vacuum vents is set such that vapor velocity through the vent is kept below about 5-6 meters sec$^{-1}$.

Preferred embodiments of the present invention also provide a process wherein the polyphenylene ether resin comprises a low odor polyphenylene ether resin comprising a 2,4,6-trimethylanisole content of less than about 50 parts per million by weight based on said resin and a source of amine content of greater than about 10,000 parts per million based on said resin. Preferably the low odor polyphenylene ether resin is prepared by oxidatively coupling a phenol in the presence of a catalyst in a solvent comprising a normally liquid aromatic hydrocarbon in a polymerization zone until formation of said resin and by-products are substantially complete and recovering said resin by the addition of a $C_1$ to $C_6$ alcohol to the polymer solution and recovering said aromatic hydrocarbon containing said by-products and distilling to reduce the content of siad by-products and thereafter recycling said aromatic hydrocarbon essentially free of said by-products to the polymerization zone.

Among the preferred features of the present invention comprise processes for shaping the low odor composition into pellets, foamed boards or sheets, solid sheets, molded or extruded articles and the like.

DETAILED DESCRIPTION OF THE INVENTION

The polyphenylene ethers (also known as polyphenylene oxides) used as component (a) in the present invention are a well known calss of polymers and are disclosed in Hay, U.S. Pat. No. 3,306,874 and 3,306,875.

The polyphenylene ethers favored for use in the practice of this invention generally contain structural units of the following formula

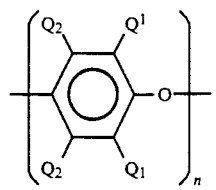

in which, independently, each $Q_1$ is hydrogen, halogen, primary or secondary lower alkyl contaiing up to 7 carbon atoms, phenyl, haloalkyl or amino alkyl wherein at least two carbon atoms separate the halogen or nitrogen atom from the benzene righ, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined in $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often each $Q_1$ is alkyl or phenyl, especially $C_{1-4}$ alkyl, and each $Q_2$ is hydrogen.

Both homopolymers and copolymers are included in the foregoing description. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature including the various Hay patents. Also contemplated are graft copolymers, including those prepared by grafting onto the polyphenylene ether chain such vinyl monomers as acrylonitrile and vinyl aromatic compounds (for example, styrene) and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.30 to 0.6 deciliters per gram (dl/g) as measured in solution in chloroform at 25° C.

The polyphenylene ethers are typically prepared by the oxidative coupling of at least one corresponding monohydroxyaromatic compound. Particularly useful compounds are 2,6-xylenol (wherein each $Q_1$ is methyl and each $Q_2$ is hydrogen), whereupon the polymer may be characterized as a poly(2,6-dimethyl-1,4-phenylene ether), and 2,3,6-trimethylphenol (wherein each $Q_1$ and one $Q_2$ is methyl and the other $Q_2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, omega-hydroxyaromatic aldehydes, o-hydroxyazo compounds, beta-hydroxyoximes (monomeric and polymeric), o-hydroxyaryl oximes and beta-diketones. Also useful are known cobalt-containing catalyst systems. Suitable manganese and cobalt-containing catalyst systems for polyphenylene ether preparation are known in the art by reason of disclosure in numerous patents and publications.

The process of this invention may also be employed with functionalized polyphenylene ethers. These may be prepared by the reaction of at least one functionalizing agent with a polyphenylene ether. The functionality of the functionalized polyphenylene ether may be present on the end group; for example, as a result of a reaction with the phenolic terminal hydroxy group. Functionalization may also involve one of the aromatic groups in the aromatic rings in the polymer chain, or an alkyl group attached thereto.

One method of functionalizing the polyphenylene ether is by reaction with at least one compound containing (a) a carbon-carbon double or triple bond, hydroxy group, alkoxy group, arloxy group or acyl halide group, and also (b) a carboxylic acid, acid salt, acid anhydride, acid amide, acid ester or imido group. A wide variety of such compounds are suitable for use in the invention. Many illustrative compounds are listed in U.S. Pat. No. 4,315,086 and U.S. Pat. application Ser. No. 885,497 filed Jul. 14, 1986 (now abandoned). They include maleic, fumaric, itaconic and citraconic acids and their derivatives, various unsaturated fatty oils and the acids derived therefrom, relatively low molecular weight olefinic acids such as acrylic acid and its homologs, and the like.

Other contemplated functionalizing agents are the aliphatic polycarboxylic acids and derivatives thereof disclosed in U.S. Pat. application Ser. No. 736,489 filed May 20, 1985. Illustrative polycarboxylic acids of this type are citric acid, maleic acid and agaricic acid and their esters, amides and salts.

Still another class of contemplated functionalizing agents are disclosed in U.S. Pat. No. 4,600,741. Illustrative compounds within this class are carboxymethylsuccinic anhydride acid chloride and trimellitic anhydride acid chloride (TAAC).

The present invention also includes resin compositions comprising polystyrene resins in addition to the polyphenylene ether resin. Polystyrene resins are generally added to the polyphenylene ether resin in order to improve the processability of the resin.

The polystyrene resins are broadly defined herein and based at least in part from compounds of the formula

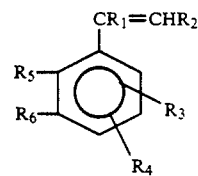

wherein $R_1$ and $R_2$ are selected from the grpup consisting of lower alkyl or alkenyl groups of from 1 to 6 carbon atoms and hydrogen; $R_3$ and $R_4$ are selected from a group consisting of chloro, bromo, hydrogen and lower alkyl groups of from 1 to 6 carbon atoms, $R_5$ and $R_6$ are selected from a group consisting of hydrogen and lower alkyl and alkenyl groups of from 1 to 6 carbon atoms or $R_5$ and $R_6$ may be concatenated together with hydrocarbonyl groups to form a naphthyl group.

Compounds within the above formula include styrene and its homologs and analogs. In addition to styrene, examples include alpha-methyl styrene, para-methyl styrene, 2,4-dimethyl styrene, chlorostyrene, dichlorostyrene, bromostyrene, dibromostyrene, p-tert-butyl styrene, p-ethylstyrene, vinylxylene, divinylbenzene and vinylnaphthalene. Styrene is especially preferred.

Also contemplated for use in the present invention are rubber modified polystyrenes, including high impact polystyrenes generally known as HIPS. In general, these modified polystyrene resins are made by adding rubber or rubber precursors, such as dienes, polydienes, olefin rubbers, acrylonitrile rubbers, acrylic rubbers and the like, during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPD) rubbers styrene-butadiene copolymers (SBR), polyacrylates, polynitriles, mixtures thereof and the like. The amount of rubber employed will vary, depending on such factors as the process of manufacture and individual requirements.

Included within this family of materials for purposes of this invention are more recently developed forms in which such factors as the rubber particle size, the gel and cis contents of the rubber phase, and the rubber volume percent are regulated or controlled to achieve improvements in impact resistance and other properties. These kinds of rubber modified polystyrenes and HIPS are described in the patent literature, including Katchman and Lee, U.S. Pat. No. 4,128,602 and Cooper and Katchman, U.S. Pat. No. 4,528,327.

Also contemplated as suitable for use herein are rubber modified polystyrenes and HIPS having morphological forms which are sometimes referred to as coreshell, comprising particles of rubber encapsulated polystyrene dispersed in a matrix of polystyrene resin. Examples of this type are disclosed in Bennett and Lee, U.S. Pat. No. 4,513,120 as well as the above-mentioned U.S. Pat. No. 4,528,327.

Polyphenylene ether (PPE) resins and polystyrene (PS) resins are combinable in all proportions, e.g., from about 1 to about 99 parts by weight polyphenylene phenylene ether and from about 99 to about 1 part by weight polystyrene. It is contemplated, however, that low density compositions of the present invention are comprised of at least 2 weight percent PPE, based upon the weight of PPE and PS taken together. Compositions containing less than 2 weight PPE are considered to be primarily polystyrene compositions and do not generally exhibit the preferred property improvements associated with PPE/PS blends. It is well known that the addition of PPE to polystyrene resins offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 5 to 95 percent and preferably 20 to 80 percent by weight PPE and 95 to 5 percent and preferably 80 to 20 percent by weight PS based upon the weight of the two resins taken together.

It is also contemplated in the present invention to add an effective amount of an organic or inorganic particulate material as a nucleating agent to the resin composition to induce bubble formation and increase surface area during devolatilization. One can use ground glass, carbon black, talc, and the like. Preferably the nucleating agent comprises talc in an amount of up to about 2 percent by weight based on said resin composition.

An essential step in the method of this invention is extrusion of the polyphenylene ether composition with styrene resin. Extrusion may be conducted using any known equipment for this operation, including single-screw and twin-screw extruders. See, for example, Modern Plastics Encyclopedia/88, Oct. 1987, McGraw Hill, New York, p. 228-238. Especially suitable for amine removal is a co-rotating twin screw extruder.

Since multiple stages of water injection and vacuum venting are also essential features of this invention, the presence of suitable ports in the extruder for injection of a stripping agent and vents for vacuum venting are mandatory. The stripping agent may be introduced at any point upstream of the first vent or set of vents; however, it is highly preferred to introduce the stripping agent through a port located at a point in the extruder where the polymer composition has been converted into a fully developed polymer, since this facilitates intimate contact with the polymer.

Water or steam are the preferred stripping agents, and the proportion employed is up to about 15 percent by weight of the polymer composition, to be divided equally, or unequally, among the two or more injection ports located along the length of the extruder barrel. The preferred proportion is about 1-10 percent, since an amount within this range is generally optimally effective for removal of volatiles without burdening the vacuum system. For example, where two injection ports are present and about 5 percent total water by weight of polymer composition is to be used, each injection port would inject about 2½ percent of the water into the extrudate.

The degree of vacuum will depend on several factors, including the proportion of volatile impurities in the polyphenylene ether or polyphenylene ether/polystyrene resin and the amount of water to be employed. In general, it is preferable to limit the vapor velocity across the vent interface to about 5-6 meters sec$^{-1}$ and the pressure should be set accordingly.

In most instances, maximum or near maximum rate of rotation of the extruder screw or screws should be maintained for effective volatilization. The rotation rate will to some extent be dependent on the equipment used, but values in the range of about 300 to about 500 revolutions per minute are generally sufficient.

Referring to the drawing, extruder 1 comprises a heated barrel 2 and a multi-flight screw 4 adapted to co-rotate with a twin screw (not shown). Feed hopper 6 located at the upstream end is adapted to receive polyphenylene ether or polyphenylene ether and polystyrene and any conventional additives and, if desired, a nucleating agent, such as talc. As the resin moves downstream, it is heated and melted. The resin melt then encounters stage 20 comprising water injection port 8 and vacuum vents 10 and 12. The resin melt which exits stage 20 immediately encounters the second stage 22 comprising water injection port 14 and vacuum vents 16 and 18. Finally, the material exits the extruder at front barrel outlet 24. The exiting product can be extruded into shapes or cut into pellets for further processing in accordance with conventional techniques.

It is further contemplated to employ a polyphenylene ether resin essentially free from phenolic odoriferous by-products of polymer synthesis, such as 2,4,6-trimethylanisole and 7-methyldihydrobenzofuran, removed from the normally liquid aromatic hydrocarbon recycle stream by distillation. The distillation may be performed in any suitable distillation column. The recycle aromatic hydrocarbon stream is fed into a column shell comprising various plates or trays, which are used to bring the vapor and liquid phases of the feed material into intimate contact, stacked one above the other inside the enclosed column. Optionally, a packed column may be employed. The aromatic hydrocarbon solution is boiled and the purified aromatic hydrocarbon vapor is collected and condensed at the top of the column, while the impurities remain liquid and are collected at the bottom of the column. The number of trays necessary is dependent upon the degree of purity desired in the distillate and the type of tray used. Suitable for the practice of this invention are distillation columns employing sieve type trays ranging from about 40 to about 65 in number.

Distillation is carried out to render the recycle aromatic hydrocarbon essentially free of byproduct content. Essentially free is defined as the level of odoriferous impurities present in the recycle aromatic hydrocarbon such that recycling the aromatic hyrocarbon to the polymerization zone results in a very low odor product resin, not detectable by individuals with highly developed olfactory systems. Preferably, the 2,4,6-trimethylanisole content in the recycle aromatic hydrocarbon is reduced to less than about 5 parts per million and the 7-methyldihydrobenzofuran is reduced to less than about 50 parts per million.

Other embodiments of the process of the present invention, include shaping the low odor composition into pellets, solid sheets, foamed sheets or boards, molded or extruded articles and the like.

Any conventional hot or cold pelletizing or dicing systems may be used to form pellets. Cold cutting systems are generally dicing, strand pelletizing and strand (forced conveyance) pelletizing systems. Hot cutting systems generally comprise water ring pelletizers, hot face pelletizers, underwater pelletizers and centifuged pelletizers. See generally Modern Plastics Encyclopedia/88, McGraw-Hill, 1987, pp. 340-342. Solid sheets are generally formed by extending the molten composition through dies specially suited for forming solid sheets, such as flat sheet dies, although any die which will produce a solid sheet may be employed. See generally, Modern Plastics Encyclopedia/88, McGraw Hill, 1987, pp. 236-237. Extruded or molded articles may be produced in any conventional process and apparatus known to those skilled in the art.

Optionally, the low odor composition may be foam processed. Any suitable apparatus for extruding foamed sheets or boards may be employed in this shaping process. See for example, Modern Plastics Encyclopedia/88, McGraw Hill 1987, pp 238-246. Especially suitable for the practice of the present invention are tandem extruders. The resin composition is fed into a first mixing-melting single or twin screw type extruder and melted and mixed therein with a liquid blowing agent at sufficient temperature and shear to provide an intimate blend.

During the blending step it is also contemplated to introduce conventional additives into the polymer composition melt. These include nucleating agents, flame retardants, thermal and color stabilizers, antioxidants, processing aids, plasticizers, reinforcing and extending fillers, pigments, dyes and the like. Each of these may be utilized to a greater or lesser degree depending on the desired final properties of the foamed product. Conventional surfactants and nucleants may also be utilized, such as zinc or tin stearates, maleates and fumarates.

Suitable nucleating agents, which aid in controlling the foam cell size and number of foam cells, usually comprise a fine powder such as talc or a combination of citric acid and bicarbonate of soda.

Suitable blowing agents to be used in the melt produced in the extruder include conventional hydrocarbons, chlorofluorocarbons, and hydrochlorofluorocarbons. Hydrocarbon blowing agents will include aliphatic hydrocrbons, especially those having 4 to 7 carbon atoms such as pentane, isopentane, pentene, hexane, heptane, butane and the like. Chlorofluorocarbon blowing agents include $CCl_3F$, $CCl_2F_2$, $C_2Cl_3F_3$, $C_2ClF_5$, $CHClF_2$ and $CCl_2F_2\text{-}CClF_2$. These are comercially L available as Freon®11, Freon®12, Freon®22, Freon®113, Freon®115 and Freon®114. Hydrochlorofluorocarbon blowing agents include compounds such as chlorodifluoromethane, dichlorofluoromethane, dichlorodifluoroethane and the like.

Although the extrudate can be foamed through a die in the first extruder, preferably the extrudate is transferred through a pressurized closed conduit to a second single or twin screw extruder.

The conduit should be heated to maintain melt consistency. In the second extruder, the melt is cooled and exits as a foam at a die located at the downstream end of the extruder barrel.

As an alternative, the blowing agent can also be introduced into the devolatilizing extruder to obtain a melt which contains the liquid blowing agent under pressure. This material can be foamed directly out a die at the downstream end of the devolatilizing extruder or may be transferred to single or tandem foam extruders for foaming.

Also contemplated by the present invention is combining the low odor composition of the present invention with let-down resins, including polyphenylene ether resins, prior to further processing or shaping. Resins such as a polystyrene, a rubber modified polystyrene, copolymers of styrene and acrylonitrile, a poly(butylene terephthalate), a poly(bisphenol-A carbonate), a poly(etherimide ester), a poly(ester carbonate), a polyamide resin, ABS resins, and the like, or a mixture of any of them can be used as let-down resins.

Furthermore, it should be clear from the preceding that the present invention also includes various low odor compositions based on polyphenylene ether. For example, this invention contemplates a pellet formed substantially of polyphenylene ether or blends of polyphenylene either and polystyrene, and containing less than about 5 parts per million of 2,4,6-trimethylanisole (TMA).

These pellets can be produced by a process which comprises extruding a composition which itself comprises a polyphenylene ether resin having sources of odoriferous amine content of greater than about 10,000 parts per million based on the resin; alone, or in combination with a styrene resin. The extrusion is carried out by the teachigns provided above, and in the examples which follow.

DESCRIPTION OF PREFERRED EMBODIMENTS

The following examples illustrate the present invention. They are not to be construed to limit the claims in any manner whatsoever.

EXAMPLE 1

A poly(2,6-dimethyl-1,4-phenylene ether)/polystyrene homopolymer blend comprising about 50 parts by weight of each resin component is fed into an extruder equipped with a two stage water injection/vacuum venting system at a rate of 318 kg/hr, a screw speed of 350 rpm, barrel temperature setpoints at 343° C., a melt temperature of 360° C. wherein water is injected at a rate of 1.5 weight percent of the feed at each injection port and the vacuum pressure set at about 130-150 mbar. The starting material contains 9 ppm of TMA, 0.5 percent of DBA and 1500 ppm of toluene. A control sample is fed into a single stage water injection vacuum venting system extruder at the same processing parameters except that water is injected at 3 weight percent of the feed rate through the single injection port. The results of volatile substance removal are set forth below in Table 1.

TABLE 1

| VOLATILES REDUCTION 50/50 PPE/PS EXTRUDATE | | |
|---|---|---|
| Examples | 1* | 1 |
| EXTRUDER PARAMETERS | | |
| Feed Rate, kg/hr | 318 | 318 |
| Screw Speed, rpm | 350 | 350 |
| Barrel Temp., °C. | 343 | 343 |
| Melt Temp. °C. | 360 | 360 |
| Water Injection Rate, % | 3 | 1.5 |
| Vacuum Pressure, mbar | 130-150 | 130-150 |
| EXTRUDATE VOLATILES | | |
| Styrene monomer, ppm | 1130 | 694 |
| Toluene, ppm | 271 | 84 |
| DBA, % | 0.18 | 0.15 |
| TMA, ppm | 2.6 | 0.27 |
| 7-MDBF | 3.3 | 0.1 |

*Control Sample
DBA = di-butyl amine
TMA = 2,4,6-trimethylanisole
7-MDBF = 7-methyldihydrobenzofuran The table clearly shows that using an equal amount of water in a two stage process results in a vastly greater reduction of volatile impurities from the extrudate than can be accomplished in a one stage process.

EXAMPLE 2

A resin composition comprising 70 parts by weight of poly(2,6-dimethyl-1,4-phenylene ether) and 30 parts by weight of polystyrene homopolymer is fed into an extruder equipped with a single stage water injection vacuum venting system at a rate of 81.8 kg/hr, a screw speed of 350 RPM, barrel temperature setpoints at 315° C., wherein water is injected at a rate of 2.5% and 5% and the vacuum pressure is set at 35 mbar. The resin composition contains about 0.7% DBA by weight and also 175 ppm TMA by weight. A resin composition containing 20 ppm of TMA is extruded under the same conditions, except that water is injected at a rate of 2.5 weight % of the feed at each of two water injection ports. The results of volatile substance removal are set forth below in Table 2.

TABLE 2

|  | 2A* | 2B* | 2C* | 2 |
|---|---|---|---|---|
| EXTRUDER PARAMETERS |  |  |  |  |
| Feed rate, kg/hr | 82 | 82 | 82 | 82 |
| Screw speed, rpm | 350 | 350 | 350 | 350 |
| Barrel Temp., °C. | 315 | 315 | 315 | 315 |
| Water injection rate, % | 2.5 | 5 | 0 | 5 |
| Number of injection stages | 1 | 1 | 0 | 2 |
| Vacuum pressure, mbar | 35 | 35 | 35 | 70 |
| FEEDSTOCK VOLATILES |  |  |  |  |
| TMA, ppm | 175 | 175 | 175 | 20 |
| DBA, wt. % | 0.7 | 0.7 | 0.7 | 0.7 |
| % TMA removed | 85 | 86 | 80 | 97 |
| EXTRUDATE VOLATILES |  |  |  |  |
| TMA, ppm | 26 | 24 | 34 | 0.5 |
| DBA, wt. % | 0.32 | 0.31 | 0.37 | 0.17 |
| % TMA removed | 85 | 86 | 80 | 97 |

\* = Control Sample
TMA = 2,4,6-trimethylanisole
DBA = di-butyl amine
wppm = weight parts per million The table clearly shows using an equal amount of water in a two stage process results in a vastly greater reduction of volatile impurities from the extrudate than can be accomplished in a one-stage process.

EXAMPLE 3

The procedure of Example 2 is repeated for a resin composition comprising 49 parts by weight of poly (2,6-dimethyl-1,4-phenylene ether), 49 parts by weight of polystyrene homopolymer and 2 parts by weight of talc. Many tiny bubbles are created in the vacuum vented section. The extrudate is comminuted into pellets and the pellets are odorless. Without talc, occasional individuals with highly developed olefactory systems sometimes state that the pellets are slightly odorous. When molded into soup containers, the products of this example pass the soup taste test, a very discriminating test for low odor in food packaging.

The above-mentioned patents, applications and publications as well as test methods are incorporated herein by reference.

Many variations of the present invention will suggest themselves to those skilled in this art in light of the above detailed description. For example, instead of polyphenylene ether in Example 1, a mixture of 100 parts of polyphenylene ether and 0.7 parts of fumaric acid can be fed into the extruder and a functionalized polyphenylene ether with a very low odoriferous amine content can be obtained. Instead of poly(2,6-dimethyl-1,4-phenylene ether), a poly(2,6-dimethyl-co-2,3,6-trimethyl-1,4-phenylene ether) can be used. Additionally, a low odor polyphenylene ether resin may be employed. A three stage extrusion can be used in which the first stage comprises carbon dioxide injection followed by vacuum venting, followed by two water injection vacuum venting stages. Steam can be used instead of water. All such obvious variations are within the full intended scope of the appended claims.

We claim:

1. A low odor polyphenylene ether or polyphenylene ether/polystyrene pellet which contains less than about 5 parts per million of 2,4,6-trimethylanisole, produced by a process which comprises extruding a composition which itself comprises:
   a) a polyphenylene ether resin having sources of odoriferous amine content of greater than about 10,000 parts per million based on said resin; alone, or in combination with
   b) a styrene resin;
   said extrusion being carried out at a temperature above the melting point of the composition, in one pass in at least two stages, each stage comprising water injection followed by vacuum venting, the total amount of water being divided between said stages and comprising up to about 15% by weight of said composition;
   and then shaping the low odor composition into a pellet.

2. A low-odor polyphenylene ether or polyphenylene ether/polystyrene foamed sheet or foamed board which contains less than about 5 parts per million of 2,4,6-trimethylanisole, formed of the composition-by-process of claim 1, including the additional process stesps of:
   (i) feeding the low odor composition into at least one extruder and mixing it with a blowing agent; and then
   (ii) foaming the mixture through a die to form a shaped, foamed sheet or board having very low odor in human organoleptic tests.

3. A low-odor polyphenylene ether or polyphenylene ether/polystryene solid sheet formed from the composition-by-process of claim 1, with the additional process step of extruding the composition through a suitable die to form a solid sheet having very low odor in human organoleptic tests.

4. A low odor polyphenylene ether or polyphenylene ether/polystyrene extruded article formed from the composition-by-process of claim 1, with the additional process step of extruding the composition thorugh a suitable die to form an extruded article having very low odor in human organoleptic tests.

5. A low odor polyphenylene ether or polyphenylene ether/polystyrene article formed from the composition-by-process of claim 1, with the additonal process step of molding the composition to form a molded article having very low odor in human organoleptic tests.

6. The pellet of claim 1, wherein the content of 7-methyldihydrobenzofuran is less than about 50 parts per million after said extrusion.

7. The foamed sheet or foamed board of claim 2, wherein the content of 7-methyldihydrobenzofuran in the composition of the sheet or board is les than about 50 parts per million.

* * * * *